Patented Mar. 29, 1932

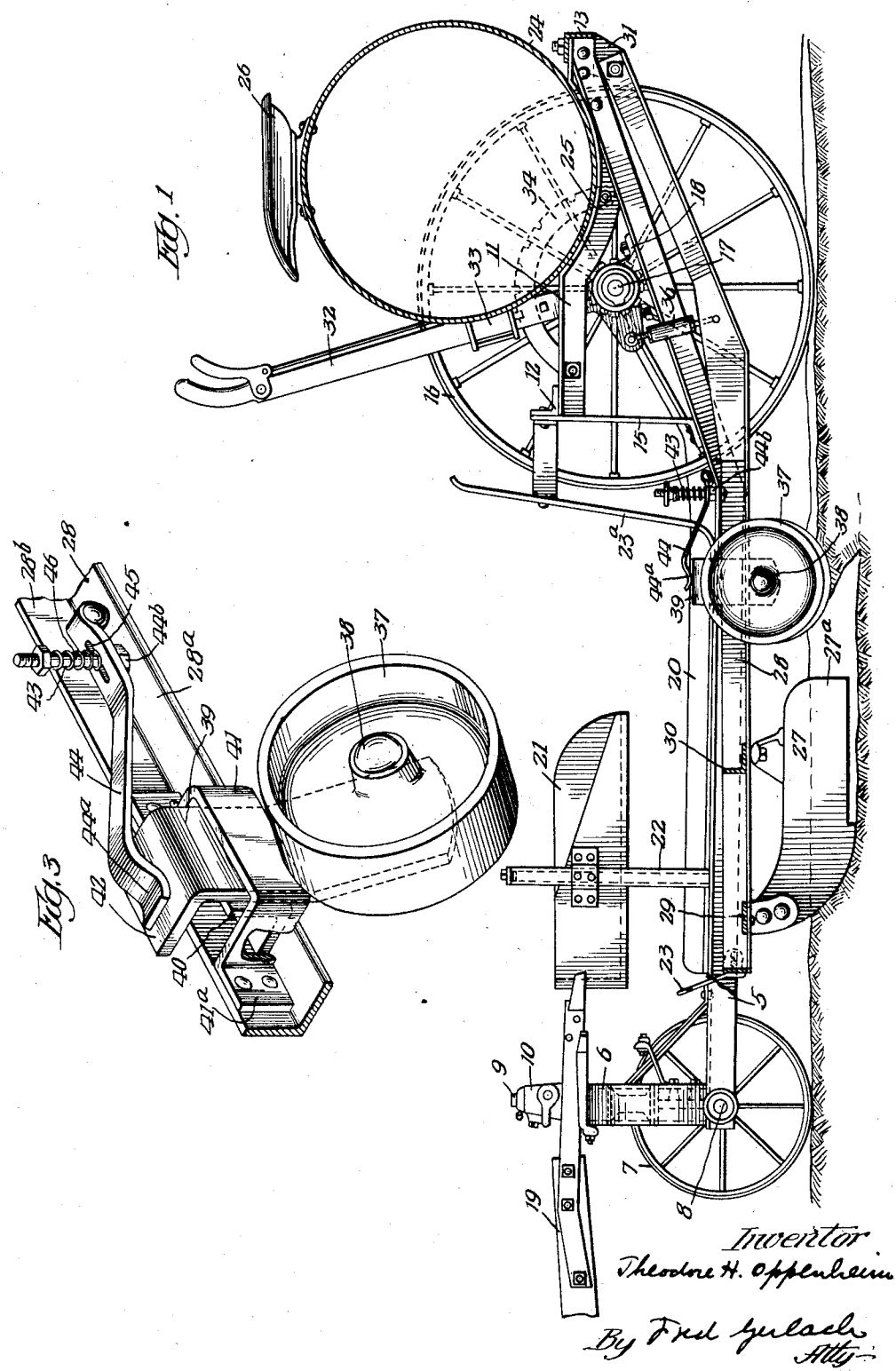

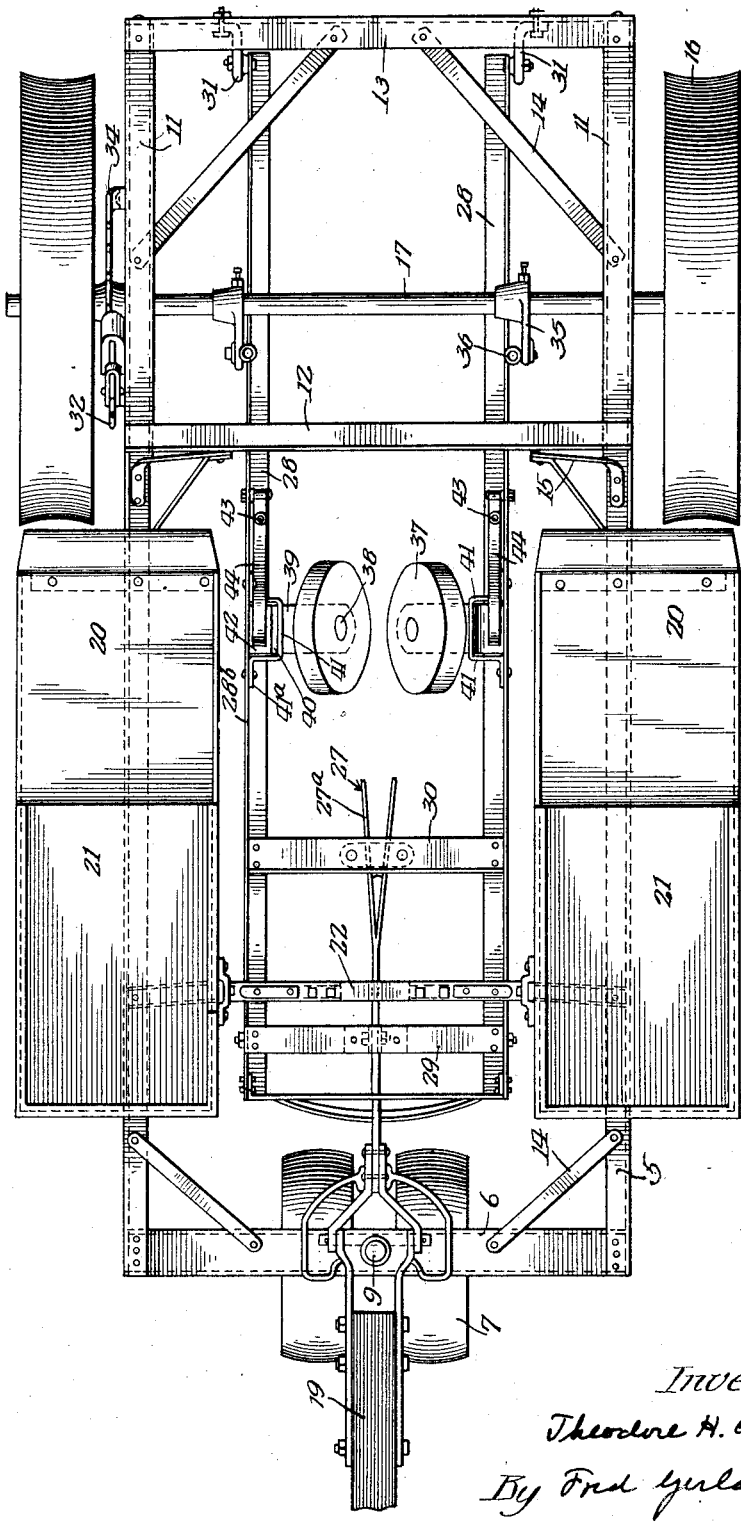

1,851,936

UNITED STATES PATENT OFFICE

THEODORE H. OPPENHEIM, OF COLDWATER, OHIO, ASSIGNOR TO THE NEW IDEA SPREADER COMPANY, OF COLDWATER, OHIO, A CORPORATION OF OHIO

TRANSPLANTER

Application filed May 18, 1928. Serial No. 278,797.

The invention relates generally to transplanters. More particularly the invention relates to that type of transplanter which comprises a main carrying frame embodying front and rear ground wheels with seats for operatives or plant setters between them, a subframe having a furrow-opener at the front end and its rear end pivotally mounted so that it may be adjusted vertically and locked in place to cut a furrow of the desired depth and wheels or plates arranged behind the furrow-opener and in front of the rear ground wheels and adapted to push the displaced soil around the roots of the plants and close the furrow.

In transplanters of this character, it has heretofore been the practice to support the soil pushing devices on a spring-pressed angle iron floating frame which overlies the sub-frame and causes said devices to raise and lower together in response to variations, such as hillocks or depressions in the soil. Because of this angle iron frame and especially the bars at the sides thereof, the space between the furrow opener and the soil pushing devices is narrow and more or less restricted and consequently difficulty is experienced in manipulating or depositing the plants into the furrow.

The primary object of the present invention is to provide a transplanter of the type under consideration in which the soil pushing or pressing devices are slidably connected to the side members of the sub-frame and are pressed downwardly into contact with the soil by means of springs. A characteristic and an advantage of this arrangement is that the press wheels or plates operate individually and the space through which the plants are deposited into place is of maximum width because no floating frame whatsoever is utilized.

Another object of the invention is to provide a transplanter which is of new and improved construction and is an improvement upon previously devised transplanters of the same general character.

A further object of the invention is to provide a transplanter which is an improvement upon that disclosed in Letters Patent of the United States, No. 1,651,851, granted to Henry Synck on the 6th day of December, 1927.

Other objects of the invention and the various advantages and characteristics of the present transplanter construction will be apparent from a consideration of the following detailed description.

In the drawings which accompany and form a part of this specification or disclosure and in which like numerals of reference denote corresponding parts throughout the several views:

Figure 1 is a longitudinal sectional view of a transplanter embodying the invention;

Figure 2 is a plan view, parts being omitted for purposes of illustration; and

Figure 3 is a perspective view of one of the independently operable press wheels and the parts associated therewith.

The transplanter which forms the subject matter of the invention comprises a main carrying frame which consists of a pair of angle iron sills or side members 5. These sills are held in spaced relation by a channel iron cross bar 6 which is rigidly secured to the front ends of said sills and is in the form of an arch so as to extend over the dirigible front wheels 7 of the transplanters. The wheels 7 are journalled on a comparatively short cross-axle 8 which is connected to the lower end of a king-pin 9. The upper end of this king-pin is mounted in a bearing 10 which is secured to the central portion of the arch or cross bar 6. The rear ends of the sills 5 are bent so as to extend upwardly and are rigidly secured to the central portions of a pair of forwardly extending angle iron arm members 11. The latter are connected at their front ends by a cross bar 12 and at their rear ends by a cross-bar 13. Both bars 12 and 13 are formed of angle iron and together with the arch 6, sills 5 and arm members 11 form a rigid frame structure. Diagonal braces 14 are provided at the corners of the frame for reinforcing purposes. The front ends of the arm members 11 are supported from the sills 5 by vertical braces 15. The rear end of the transplanter is carried by a pair of ground wheels 16 which are rotatably mounted on the ends of an axle 17. The latter is journalled in a pair of bearing brackets 18 which are secured to the sills 5 respectively. A draft tongue 19 is connected to the king-pin 9.

Relatively long seats 20 for the plant-setters or operatives are suitably supported between the front ends of the sills and the bent portions at the rear. Plant boxes 21 are supported above the front ends of these seats by means of an arch 22 which has the leg or side-members thereof rigidly connected to the sills 5. Foot rests 23 and back rests 23a are suitably supported in place adjacent the front and rear ends of the seats respectively. A tank 24 from which water is supplied to the plants, is carried at the rear of the transplanter and is mounted in arcuate seats 25 which are formed in the arm members 11. A seat 26 for the driver of the transplanter is secured to the top of the tank. The cross-bar 12 operates as a step for the driver and also as a foot rest.

A furrow-opener 27 is disposed directly behind the dirigible front wheels 7 and is fixed to the front end of a sub-frame which comprises a pair of substantially parallel side members 28. The latter are formed of angle iron and are held in spaced relation by cross-bars 29 and 30. These bars are riveted or otherwise secured to the side members 28 so as to form a rigid structure. The side members 28 are spaced apart so as to leave a comparatively wide space between them through which the plants may be deposited by the operatives into the furrow. The rear ends of the side members 28 are bent so as to extend upwardly and are pivotally connected to lugs 31 which are secured to the cross-bar 13 at the rear end of the transplanter. By connecting the side members in this manner the sub-frame is suspended so that its front end may be raised or lowered to adjust the position of the furrow-opener. The sub-frame is locked in its various positions by means of a hand lever 32 which is disposed at one side of the tank 24 and is extended so as to be within convenient reach of the driver. This lever is fixed to the rear axle 17 and carries a manually operable locking device 33 which cooperates with an arcuate rack 34. The latter is secured in any suitable manner to one of the arm members 11. Arms 35 are fixed to the axle 17 and are operatively connected to the side members 28 by turn-buckle connections 36. When it is desired to adjust the position of the sub-frame so as to raise or lower the furrow-opener the lever 32 will be shifted either rearwardly or forwardly to rotate the axle 17 and the arms 35. This rotary movement is in turn imparted to the turn-buckle connections and effects the desired adjustment. The aforementioned turn-buckle connections are in the form of links which are pivotally connected to the side members 28 and the distal ends of the arms 35. The furrow-opener comprises a pair of reversely curved plates 27a which are connected to the cross-bars 29 and 30. The sub-frame embodies no cross-bar behind the rear end of the opener 27 with the result that the space through which the plants are deposited into the furrow is free from obstruction. The side members 28 are preferably arranged so that they are positioned adjacent the inner side margins of the seats 20 and consequently they do not interfere with the transplanting operation.

The soil is pushed around the roots of the plants that are deposited into the furrow, by means of a pair of presser wheels 37 which are positioned behind and are spaced from the furrow-opener 27 and are slidably connected to the side members 28 respectively so that they are free to rise and fall in response to depressions and other irregularities in the ground-surface. Each wheel 37 is rotatably mounted on the inner end of a spindle 38 which is fixed to the lower end of a bracket or elongated plate 39. The sliding connection for each wheel comprises an angle-bracket 40 and a strap 41 which are spaced apart to form a vertical guide in which the upper end of one of the brackets 39 is confined. The angle-brackets 40 are secured to the horizontal legs 28a of the side members 28 of the sub-frame and are arranged so that the operative or guide-forming parts are substantially flush with the inner edges of said horizontal legs 28a. The ends of the straps 41 are bent outwardly and then longitudinally to form attaching members 41a which are riveted or otherwise secured to the vertical legs 28b of the side members 28. The central portions of the straps are disposed opposite the vertical parts of the brackets 40, and are spaced therefrom to form the aforementioned guides for the brackets or plates 39. The lower ends of the latter are bent inwardly so as to extend angularly. This causes the wheels to be inclined and operates to form abutments or stops for limiting the upward movement of the brackets 39 relatively to the side members 28. The upper ends of the brackets are bent outwardly at substantially right angles to form stop-lugs 42 which cooperate with the angle brackets 40 to limit the downward movement of the wheels. A characteristic of utilizing sliding connections of this character and supporting the press wheels in the aforementioned manner is that said wheels are vertically movable independently of each other and the space behind the furrow-opener is free and unrestricted so that plants may be deposited into place in the furrow without inconvenience or difficulty.

To force the wheels 37 downwardly into firm contact or engagement with the soil so that the latter will be pushed around the roots of the plants, a pair of springs 43 are provided. The force of these springs is applied to the brackets 39 respectively, by means of a pair of arms or lever members 44 which are positioned behind the straps 41 so that they will not interfere with the plant setting operation. These arms are pivotally connected at the rear ends thereof to bolts 45 which are connected to the vertical legs 28$^b$ of the side members 28. The front ends of the arms 44 are bent downwardly and then upwardly to form concavo-convex bearing members 44$^a$ which contact with the top surface of the stop-lugs 42. The springs 43 are mounted on rods 46 which are anchored to the horizontal legs 28$^a$ of the side members 28 and extend upwardly therefrom, passing through elongated slots 44$^b$ in the arms. The springs 43 extend between the central portions of the arms 44 and nuts 47 which are threaded to the upper ends of the rods 46. By adjusting the position of these nuts, the tension of the springs may be varied as desired. When the sub-frame is raised into its uppermost position so as to remove the furrow-opener 27 from the ground, the wheels 37 will also be raised, it being manifest that as soon as the stop-lugs 42 engage the brackets 40 the wheels are not subject to the tension of the springs 43.

In operation, the driver will set and lock the sub-frame to cause the opener 27 to cut a furrow of the desired depth. Since the main frame is carried a predetermined distance above the ground and the sub-frame is rigidly locked in place, the furrow will be of uniform depth despite variations in the density of the soil. The operatives or plant setters on the seats 20 will take the plants from the boxes 21 and deposit them into the furrow immediately behind the opener 27. After the plants have been set the wheels 37 will uniformly press the displaced soil around the roots of the plants and close the furrow. In the event that it is deemed necessary to apply more or less pressure to the press wheels, the nuts 47 will be suitably adjusted on the rods 46 to vary the compression of the springs 43.

The transplanter herein described is extremely efficient in operation since the opening through which the plants are inserted into the furrow is of maximum width.

Although press wheels have been described and shown as being associated with the side members of the sub-frame, it is to be understood that press plates or disks may be used equally as well and with the same result. It is also to be understood that the invention is not to be strictly limited to the specific details set forth, since these may be modified within the scope of the appended claims, without departing from the spirit and scope of the invention.

Having thus described the invention, what I claim as new and desire to secure by Letters Patent, is:

1. In a transplanter, the combination of a main frame comprising a pair of spaced side members, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited into the furrow, means associated with one of the frames for supporting said devices so that they are free to move up and down individually, and a seat mounted on one of the side members between the front and rear wheels for carrying an operator in a position so he may drop the plants between the side members and deposit them directly into the furrow between said opener and devices.

2. In a transplanter, the combination of a main frame comprising a pair of spaced side members, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited into the furrow, sliding connections between the devices and one of the frames whereby said devices are supported so they may move vertically independently of each other, and a seat mounted on one of the side members between the front and rear wheels for carrying an operator in a position so he may drop the plants between the side members and deposit them directly into the furrow between said opener and devices.

3. In a transplanter, the combination of a main frame comprising a pair of spaced side members, front and rear ground wheels for the main frame, a furrow-opener disposed behind the front wheels and between said side members, a sub-frame connected movably at its rear end to the main frame and to which the furrow-opener is secured, means for locking said sub-frame to the main frame so the opener will cut a furrow of substantially uniform depth, devices in front of the rear wheels and behind and spaced from the furrow-opener for pushing the soil around the roots of plants deposited into the furrow, means associated with the sub-frame for supporting said devices so that they are free to move up and down individually, and a seat mounted on one of the side members between the front and rear wheels for carrying an operator in a position so he may drop the plants between the side members and deposit them directly into the furrow between said opener and devices.

4. In a transplanter, the combination of a main frame comprising a pair of side members spaced relatively to each other, front and rear ground wheels for the main frame, a furrow-opener disposed behind the front wheels and between said side members, a sub-frame connected to the main frame and to which the furrow-opener is secured, devices in front of the rear wheels and behind and spaced from the furrow-opener for pushing the soil around the roots of plants deposited into the furrow, sliding connections between the devices and one of the frames whereby said devices are supported so they are vertically movable independently of each other, spring means operable to force said devices normally into contact with the soil, and a seat mounted on one of the side members between the front and rear wheels for carrying an operator in a position so he may drop the plants between the side members and deposit them directly into the furrow between said opener and devices.

5. In a transplanter, the combination of a main frame comprising a pair of side members spaced relatively to each other, front and rear ground wheels for the main frame, a furrow-opener disposed behind the front wheels and between said side members, a sub-frame movably connected to the rear end of the main frame and to the front end of which the furrow-opener is secured, said sub-frame being formed to leave a space through which plants may be dropped behind the opener and into the furrow, devices in front of the rear wheels and behind and spaced from said furrow-opener for pushing the soil around the roots of plants deposited into the furrow, said devices being movably connected to said sub-frame so that they are vertically movable independently of each other, and a seat mounted on one of the side members between the front and rear wheels for carrying an operator in a position so he may drop the plants through the space in the sub-frame and deposit them directly into the furrow between said opener and devices.

6. In a transplanter, the combination of a main frame comprising a pair of sills, front and rear ground wheels for the main frame, a furrow-opener disposed behind the front wheels and between said sills, a sub-frame movably connected to the rear end of the main frame and to the front end of which the furrow-opener is secured, said sub-frame comprising a pair of side members spaced apart to leave an opening through which plants may be dropped behind the opener and into the furrow, devices in front of the rear wheels and behind and spaced from said furrow-opener for pushing the soil around the roots of plants deposited into the furrow, said devices being slidably connected to said side members respectively, and a seat mounted on one of the sills between the front and rear wheels for carrying an operator in a position so he may drop the plants through the opening between the side members and deposit them directly into the furrow between said opener and devices.

7. In a transplanter, the combination of a main frame comprising a pair of sills, front and rear ground wheels for the main frame, a furrow-opener disposed behind the front wheels and between said sills, a sub-frame movably connected to the rear end of the main frame and to the front end of which the furrow-opener is secured, said sub-frame comprising a pair of side members spaced apart to leave an opening through which plants may be dropped behind the opener and into the furrow, devices in front of the rear wheels and behind and spaced from said furrow-opener for pushing the soil around the roots of plants deposited into the furrow, said devices being slidably connected to said side members respectively, spring means operative to normally press the devices into contact with the soil, and a seat mounted on one of the sills between the front and rear wheels for carrying an operator in a position so he may drop the plants through the opening between the side members of the sub-frame and deposit them directly into the furrow between said opener and devices.

8. In a transplanter, the combination of a main frame comprising a pair of sills, front and rear ground wheels for the main frame, a furrow-opener disposed behind the front wheels and between said sills, a sub-frame movably connected to the main frame and to which the furrow-opener is secured, said sub-frame comprising a pair of side members spaced apart to leave an opening through which plants may be dropped behind the opener and into the furrow, devices in front of the rear wheels and behind and spaced from said furrow-opener for pushing the soil around the roots of plants deposited into the furrow, arms having the rear ends thereof pivotally connected to the side members of the sub-frame and the front ends operatively connected to said devices, and a seat mounted on one of the sills between the front and rear wheels for carrying an operator in a position so he may drop the plants through the opening between the side members and deposit them directly into the furrow between said opener and devices.

9. In a transplanter, the combination of a main frame comprising a pair of sills, front and rear ground wheels for the main frame, a furrow-opener disposed behind the front wheels and between said sills, a sub-frame movably connected to the main frame and to which the furrow-opener is secured, said sub-frame comprising a pair of side members spaced apart to leave an opening through which plants may be dropped behind the opener and into the furrow, devices in front of the rear wheels and behind and spaced from said furrow-opener for pushing the soil around the roots of plants deposited into the furrow, arms having the rear ends thereof pivotally connected to the side members of the sub-frame and the front ends operatively connected to said devices, and springs applied to the arms for forcing the devices into contact with the soil.

Signed at Coldwater, Ohio, this 11th day of May, 1928.

THEODORE H. OPPENHEIM.